(12) United States Patent
Omiya et al.

(10) Patent No.: US 8,166,194 B2
(45) Date of Patent: Apr. 24, 2012

(54) LOCK-FREE SHARED AUDIO BUFFER

(75) Inventors: Elliot H. Omiya, Kirkland, WA (US); Daniel J. Sisolak, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 11/610,460

(22) Filed: Dec. 13, 2006

(65) Prior Publication Data

US 2008/0147213 A1   Jun. 19, 2008

(51) Int. Cl.
*G06F 15/16* (2006.01)
*G06F 3/00* (2006.01)
*G06F 17/00* (2006.01)
*G06F 12/00* (2006.01)
*H04L 12/28* (2006.01)
*H04N 9/80* (2006.01)

(52) U.S. Cl. .......... 709/234; 719/310; 719/318; 700/94; 370/400; 370/395.4; 386/247; 711/103; 709/232

(58) Field of Classification Search ............. 709/234.31, 709/318, 217–229, 234, 310, 232; 700/94; 370/400, 395.4; 386/46; 711/103
See application file for complete search history.

(56) References Cited

U.S. PATENT DOCUMENTS

| | | | |
|---|---|---|---|
| 2001/0003193 A1* | 6/2001 | Woodring et al. | 709/310 |
| 2002/0131423 A1* | 9/2002 | Chan et al. | 370/400 |
| 2002/0165999 A1* | 11/2002 | Hardin et al. | 709/318 |
| 2004/0186601 A1* | 9/2004 | Swenson et al. | 700/94 |
| 2004/0264473 A1* | 12/2004 | Chen | 370/395.4 |
| 2005/0111819 A1* | 5/2005 | Cormack et al. | 386/46 |
| 2005/0251617 A1* | 11/2005 | Sinclair et al. | 711/103 |
| 2007/0143493 A1* | 6/2007 | Mullig et al. | 709/232 |

* cited by examiner

*Primary Examiner* — Ian N Moore
*Assistant Examiner* — Kiet Tang
(74) *Attorney, Agent, or Firm* — Lee & Hayes, PLLC (57) ABSTRACT

An exemplary audio system includes an audio engine, one or more shared buffers where each shared buffer is associated with a client application and one or more lock-free mechanisms to help ensure that a write position of a shared buffer stays equal to or ahead of a read position for that shared buffer and to ensure that a client application's failure to maintain a write position equal to or ahead of a read position does not prevent audio engine access to the shared buffer. Other exemplary technologies are also disclosed.

14 Claims, 7 Drawing Sheets

EXEMPLARY SCENARIOS 300

SCENARIO 310

SCENARIO 320

SCENARIO 330

SCENARIO 340

SCENARIO 350

LOCK-FREE SHARED AUDIO BUFFER

BACKGROUND

Audio streaming support in an operating system (OS) relies on periodic supply of audio data from or to a client application by an audio engine. A typical audio engine is responsible for reading and writing audio data, performing certain types of digital signal processing (DSP) on the data and sometimes mixing the streams of multiple clients together into one stream to be supplied (e.g., via I/O or memory writes) to audio hardware for rendering to human audible components (headphones, speakers, etc.). Audio engines also participate in capturing data (e.g. from microphones) and supplying that data to one or more applications.

Human hearing is very sensitive and timely delivery and processing of data is critical for a smooth auditory experience. Lateness in delivering data and/or delivery of incomplete data can lead to dissonant auditory effects, often known as "glitching". Client applications that are rendering or capturing audio data must supply or read data in a timely manner. This requires a region of memory that is accessible to both the client and the OS audio engine. It is well known in the practice of software engineering that discrete components that must simultaneously access a shared memory region often require synchronization via various mechanisms, one of which is generally known as a mutex or lock. In a system that relies on a mutex or lock, one entity takes the mutex or lock and "owns" the memory region until the mutex or lock is released. All other entities must wait until the current owner releases the mutex or lock. If every entity releases the lock within a small percentage of a processing window (e.g., commonly known as the "audio engine period" or simply "period"), smooth audio will result without any audible glitches. However, in a lock-based system, any entity which holds the lock for too long (a significant percentage of the period or longer), will cause audio to completely halt, because the audio engine will be waiting for a lock to be released. In the worst case, an errant client can cause audio to cease indefinitely until the client application is terminated or is otherwise convinced to release the lock.

There are two major types of audio glitches. The first type is known as "client starvation". This occurs when the client does not supply sufficient audio data in a timely manner. The second type is known as "audio engine starvation" and occurs when the audio engine does not supply sufficient data to a computer system's audio hardware in a timely manner. Clients who hold locks for too long in a lock-based system can cause audio engine starvation. In terms of system resiliency, it is important that clients not be able to interrupt the timely flow of audio data in the OS audio engine. Further, in a capture scenario, a client can "under read" data and lose some of the captured audio information.

Various exemplary techniques described herein can alleviate use of such aforementioned locks. An exemplary lock-free system uses one or more techniques to ensure that each individual client application (i) supplies sufficient data in a timely manner to a client's shared audio buffer when rendering or (ii) reads sufficient data in a timely manner from the client's shared audio buffer when capturing. In various lock-free examples, audio engine processing is not interrupted even if a client fails to write or read data in a timely manner. In other words, while such failure may result in a client starvation glitch for the involved stream, interruption of audio engine processing audio engine is avoided.

SUMMARY

An exemplary audio system includes an audio engine, one or more shared buffers where each shared buffer is associated with a client application and one or more lock-free mechanisms to help ensure that a write position of a shared buffer stays equal to or ahead of a read position for that shared buffer and to ensure that a client application's failure to maintain a write position equal to or ahead of a read position does not prevent audio engine access to the shared buffer. Other exemplary technologies are also disclosed.

DRAWINGS

Non-limiting and non-exhaustive examples are described with reference to the following figures.

DETAILED DESCRIPTION

Most operating systems include an associated audio system. Such an audio system allows at least one client application running on the operating system to connect to at least one endpoint device, which may be a speaker, a microphone, a CD player or other input or output device. Hence, the term "audio endpoint device" may refer generally to a hardware device that lies at one end of a data path that originates or terminates at an application program. Client applications may include media players, DVD players, games, business applications (e.g., that play sound files) and the like. In addition, an operating system may use an audio system to issue audio alerts or to receive voice commands and the like.

Inherent in the relationship between a client application and an audio endpoint device is movement of audio data or audio information. Audio data moving between an application and an endpoint device may travel along a data path that traverses a number of audio system software and/or hardware components. For example, an audio system may use an audio adapter for an audio endpoint device where a software component processes an audio stream that flows to or from the audio adapter.

Ideally an audio system should provide low-latency, glitch-resilient audio streaming, reliability, security, an ability to assign particular system-wide roles to individual audio devices, and software abstraction of an endpoint audio device, which may allow a user to manipulate, directly, for example, speakers, headphones, and microphones.

In general, an audio system may be considered as providing a link between clients and endpoint devices. Features of an audio system may benefit either side of such a link. As described herein, various exemplary features are directed to the client side of the client/endpoint device link. More specifically, various techniques are directed to management of shared memory via client side features or client side and audio system side features or interactions. Such techniques can provide for low-latency and glitch-resilient audio streaming.

Figure 1:
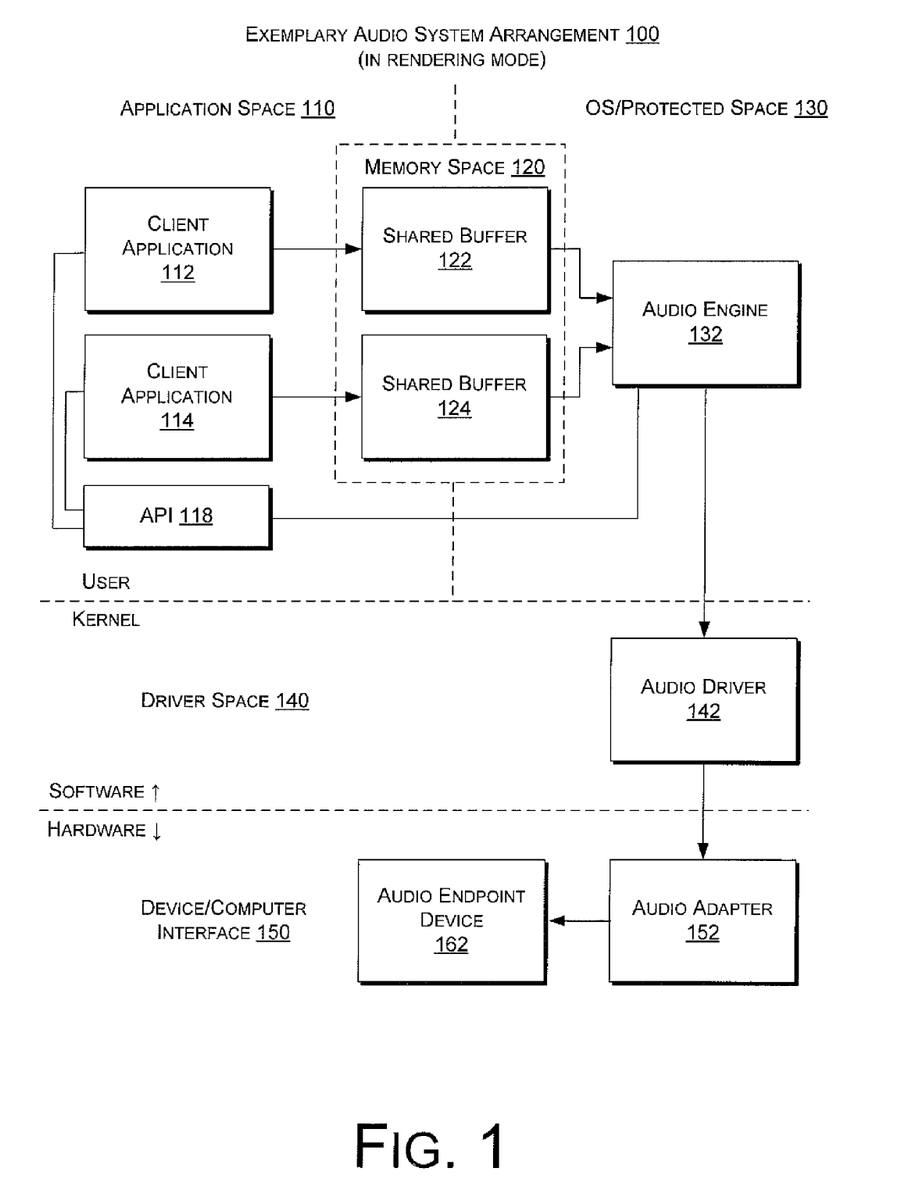
FIG. 1 is a diagram of an audio system where multiple client applications can use an audio engine for transport of audio data to and/or from an audio endpoint device.

FIG. 1 shows an audio system arrangement 100 that includes an audio engine 132 as an intermediate component to one or more applications 112, 114 and an audio endpoint device 162. The applications 112, 114 may be considered as existing in an application space 110 and the audio engine 132 in an operating system space or protected space 130 where a memory space 120 provides for one or more memory buffers 122, 124. The audio endpoint device 162 may use a device/computer interface 150 such as an audio adapter 152. An audio adapter may reside in a driver space 140 and operate through use of an audio driver 142. A driver is typically software enabled (e.g., in a kernel) while an adapter may be hardware (e.g., a plug or a bus, etc.).

An application may operate in a shared mode or an exclusive mode. When an application operates in a shared mode, the application and the audio engine rely on a shared buffer. When more than one application requires audio engine access, then each application has its own associated shared buffer. FIG. 1 shows shared buffers 122 and 124 as associated with client applications 112 and 114, respectively. The shared buffer or buffers may reside in a virtual memory space (e.g., memory space 120). Hence, the size of a shared buffer may be limited by a virtual memory space and/or sizes of any other shared buffers defined within the virtual memory space.

A shared buffer may be used along an audio-rendering data path (per FIG. 1) or an audio-capturing data path (e.g., reverse data flow in FIG. 1). An application programming interface (API) 118 may exist as a software layer between either or both of the applications 112, 114 and the audio engine 132. Such an API may facilitate movement of data between an application and an associated shared buffer. Audio system software and hardware components generally manage movement of data from a shared buffer to or from an endpoint device (or storage) in a manner that is largely transparent to a client application.

As inferred by the term "shared" an application may open a stream in shared mode whereby the application shares a buffer with an audio engine. In this mode, the application shares the audio hardware with other applications running in other processes but typically does not share its buffer with other applications as each application may have its own shared buffer. Thus, in a shared mode of operation, the client applications 112, 114 may both write data to a respective shared buffer 122, 124 and the audio engine 132 may read such data from each of the shared buffers 122, 124. Where multiple applications require use of an audio engine, the audio engine typically uses a mix buffer for purposes of mixing audio data (e.g., audio data streams) from the multiple applications. The audio engine can then play the resulting audio data mix through designated hardware. A mix buffer is typically within the domain and control of the audio engine and not directly accessible by a client application.

An audio engine may be a user-mode system component (a dynamic link library "dll") that performs all of its stream-processing operations in software. In contrast, if a client application opens a stream in exclusive mode, the client has exclusive access to a designated piece of audio hardware. Typically, only a small number of "pro audio" or communication applications require exclusive mode. FIG. 1 shows only a shared-mode stream and not an exclusive-mode stream. Only one of these two streams (and its corresponding buffer) exists, depending on whether the client application opens the stream in shared or exclusive mode.

In shared mode, the client application may be required to open a stream in a mix format that is currently in use by the audio engine (or a format that is similar to the mix format) and the audio engine's input streams and the output mix from the audio engine are generally all in this format.

In shared mode or multi-application mode, Pulse Code Modulation (PCM) stream formats may be preferred for mixing by an audio engine. In general, an audio file has two main parts: a header and the audio data. A header is typically used to store information about the file, for example, resolution, sampling rate and type of compression. Often a "wrapper" is used to add features, such as license management information or streaming capability, to a digital audio file. Many digital audio formats can be streamed by wrapping them in a streaming format, such as the Active Streaming Format (ASF). PCM is a common method of storing and transmitting uncompressed digital audio. Since it is a generic format, it can be read by most audio applications; similar to the way a plain text file can be read by any word-processing program. PCM is typically used by audio CDs and digital audio tapes (DATs). PCM is also a very common format for AIFF and WAV files. PCM is a straight representation of the binary digits (1s and 0s) of sample values When PCM audio is transmitted, each "1" is represented by a positive voltage pulse and each "0" is represented by the absence of a pulse. Variations also exist such as Differential Pulse Code Modulation (DPCM) and Adaptive Differential Pulse Code Modulation (ADPCM).

Where an application uses a proprietary or a compressed format, decompression typically occurs prior to writing data to the shared buffer. Similarly, an audio engine or audio system will typically decompress or reformat audio data to a standard format prior to writing the data to a shared buffer.

An audio engine may run in its own protected process (see, e.g., protected space 130), which is separate from the process that an application runs in (see, e.g., application space). Again, to support a shared-mode stream, an audio system service may allocate a cross-process or cross-space shared buffer that is accessible to both the application and the audio engine (see, e.g., the buffers 122 and 124).

In the example shown in FIG. 1, the endpoint device 162 may be a set of speakers that are plugged into the audio adapter 152. One of the client applications 112, 114 may write audio data to its shared buffer 122 or 124, and the audio engine 132 can handle the details of transporting the data from the shared buffer 122 or 124 to the endpoint device 162. The block 142 labeled "Audio Driver" in FIG. 1 might be a combination of system-supplied and vendor-supplied driver components. In shared mode, several clients can share a captured stream from an audio hardware device while in exclusive mode one client has exclusive access to the captured stream from the device; noting that FIG. 1 shows the rendering mode.

As already discussed, rendering pertains to a client writing audio data to a shared buffer where an audio engine subsequently reads and "renders" the audio data while capturing pertains to a client reading or "capturing" audio data from a shared buffer where the audio engine wrote the audio data to the shared buffer. With respect to capturing, the audio data written to the shared buffer by the audio engine may be from a storage medium (e.g., a CD, hard drive, memory card, etc.), from an input device (e.g., a microphone) or from another source.

Rendering

Rendering may occur by a client application accessing the shared buffer and then releasing the shared buffer. For example, a command "Get Buffer" may retrieve the next data packet of the buffer for data filling by a client while a command "Release Buffer" may add the filled data packet to the buffer. Once released, the audio engine may access the shared buffer and retrieve the data packet in a timely manner. The size of a data packet may be expressed in "audio frames" where an audio frame (in a PCM stream) is a set of samples (e.g., where the set contains one sample for each channel in the stream) that play or are recorded at the same time (clock tick). Thus, the size of an audio frame is generally the sample size multiplied by the number of channels in the stream. For example, the frame size for a stereo (2-channel) stream with 16-bit samples is four bytes.

A shared buffer may be a circular buffer. A circular buffer can introduce a risk of data overwriting. For example, if a client tries to write an amount of data that exceeds the size of unread space in the buffer, the write process may overwrite data that has yet to be read by the audio engine. A method may be used to determine how much new data a client can safely write to a shared buffer without risk of overwriting previously written data that the audio engine has not yet read from the buffer.

For rendering, a data loading function may write a specified number of audio frames to a specified buffer location. An audio data play function may use a data loading function to fill portions of a shared buffer with audio data. If the data loading function is able to write at least one frame to the specified buffer location but runs out of data before it has written the specified number of frames, then it may simply write silence to the remaining frames.

As long as the data loading function succeeds in writing at least one frame of real data (i.e., not silence) to the specified buffer location, it may output a notification parameter. When a data loading function is out of data and cannot write even a single frame to the specified buffer location, it may simply forego writing to the buffer (i.e., not even silence) and output a notification parameter that can notify a method to respond by filling the specified number of frames in the buffer with silence.

A rendering process may include an initialization step that requests a shared buffer of a certain duration (e.g., 1000 milliseconds). After such an initialization, a get buffer and release buffer method may fill the entire shared buffer before starting a method for playing audio data from the buffer. A method or methods may also be used to ensure that a shared buffer includes so-called "silence" data, especially prior to calling a stop command. Such silence data can prevent unwanted sounds before execution of a stop command that stops an audio stream.

Capturing

For capturing, a client accesses data in a shared buffer, for example, as a series of data packets. A get buffer method may retrieve a next packet of captured data from a shared buffer. After reading the data from the packet, the client application may call a release buffer method to release the packet and make it available for more captured data. A packet size may vary from one call to the next. Thus, before a get buffer call, a client application may have an option of calling a method, in advance, to get the size of the next data packet of the shared buffer. A client application may also be able to call a method to get the total amount of captured data that is available in the shared buffer.

During each processing pass, a client application may have an option of processing the captured data in one of the following ways: The client alternately calls a get buffer method and a release buffer method, reading one packet with each pair of calls, until the get buffer method indicates that the buffer is empty; or the client calls a method to get the next packet size before each pair of calls to the get buffer and the release buffer methods until the next packet size report indicates that the buffer is empty.

A data copy function may be used to copy a specified number of audio frames from a specified shared buffer location and a record function may use the data copy function to read and save the audio data from the shared buffer. The record function may allocate a shared buffer that has a particular duration (e.g., 1000 milliseconds). A call to a sleep function may cause an application to wait for a particular length of time (e.g., 500 milliseconds) where at the start of a sleep function call the shared buffer is empty or nearly empty and where at the time the sleep duration expires, the shared buffer is about half filled with capture data, as provided by the audio engine.

As already mentioned, various exemplary techniques can reduce latency and/or add glitch resiliency. A shared buffer between a client application and an audio engine should be large enough to prevent the audio stream from glitching between processing passes by the client and the audio engine. For rendering, the client thread periodically writes data to the shared buffer, and the audio engine thread periodically reads data from the shared buffer. For capturing, the engine thread periodically writes to the shared buffer, and the client thread periodically reads from the shared buffer. In either case, if the periods of the client thread and engine thread are not equal, the buffer must be large enough to accommodate the longer of the two periods without allowing glitches to occur.

An audio system may allow a client application to specify a buffer size where the client is responsible for requesting a buffer that is large enough to ensure that glitches cannot occur between the periodic processing passes that it performs on the shared buffer. Similarly, an initialization method may ensure that the shared buffer size is never smaller than the minimum size needed to ensure that glitches do not occur between the periodic processing passes that an audio engine thread performs on the shared buffer. If a client application requests a shared buffer size that is smaller than the audio engine's minimum required shared buffer size, an audio system method may set the buffer size to this minimum size rather than to the shared buffer size requested by the client application. Further, if a client application requests a buffer size that is not an integral number of audio frames, a method may round up the requested buffer size to the next integral number of frames.

To ensure client side knowledge of the actual shared buffer size, an audio system may include a method that returns the precise size of the shared buffer. During each processing pass, the client may acquire the actual buffer size to calculate how much data to transfer to or from the shared buffer. As already mentioned, a method may be used by the client application to determine how much of the data in a shared buffer is currently available for processing.

To achieve the minimum stream latency between a client application and an audio endpoint device, the client thread may be scheduled to run at the same period as a corresponding audio engine thread. The period of the audio engine thread may be fixed and, hence, not amenable to control by the client. Under such circumstances, making the client's period smaller than the engine's period unnecessarily increases the client thread's load on the processor without improving latency or decreasing the shared buffer size. A method may exist, callable by a client application, to determine the period of an audio engine's thread.

In an exemplary audio system, a client may have an option of requesting a shared buffer size that is larger than what is strictly necessary to make timing glitches rare or nonexistent.

However, increasing the shared buffer size does not necessarily increase the stream latency. For a rendering stream, the latency through the shared buffer is determined by the separation between a client application's write position and an audio engine's read position. For a capture stream, the latency through the buffer is determined by the separation between an audio engine's write position and a client application's read position. In various examples, positions may be maintained by any of a variety of mechanisms (e.g., indexes, pointers, etc.).

An exemplary audio system may implement event-driven buffering. To enable event-driven buffering, a client application provides an event handle to the audio system. While a stream is running, the audio system may periodically signal the event to indicate to the client application that audio data is available for processing. Between processing passes, a client application thread may wait on the event handle by, for example, calling a synchronization function.

A shared-mode stream may use event-driven buffering. For example, a caller may set a periodicity and a buffer duration to 0 or other null value. In such an example, an initialization method may determine how large a buffer to allocate based on a scheduling period of an audio engine. Although the client application's buffer processing thread is event driven, the basic buffer management process, remains unaltered such that each time the thread awakens, it may call a method to determine how much data to write to a rendering shared buffer or read from a capturing shared buffer.

Figure 2:
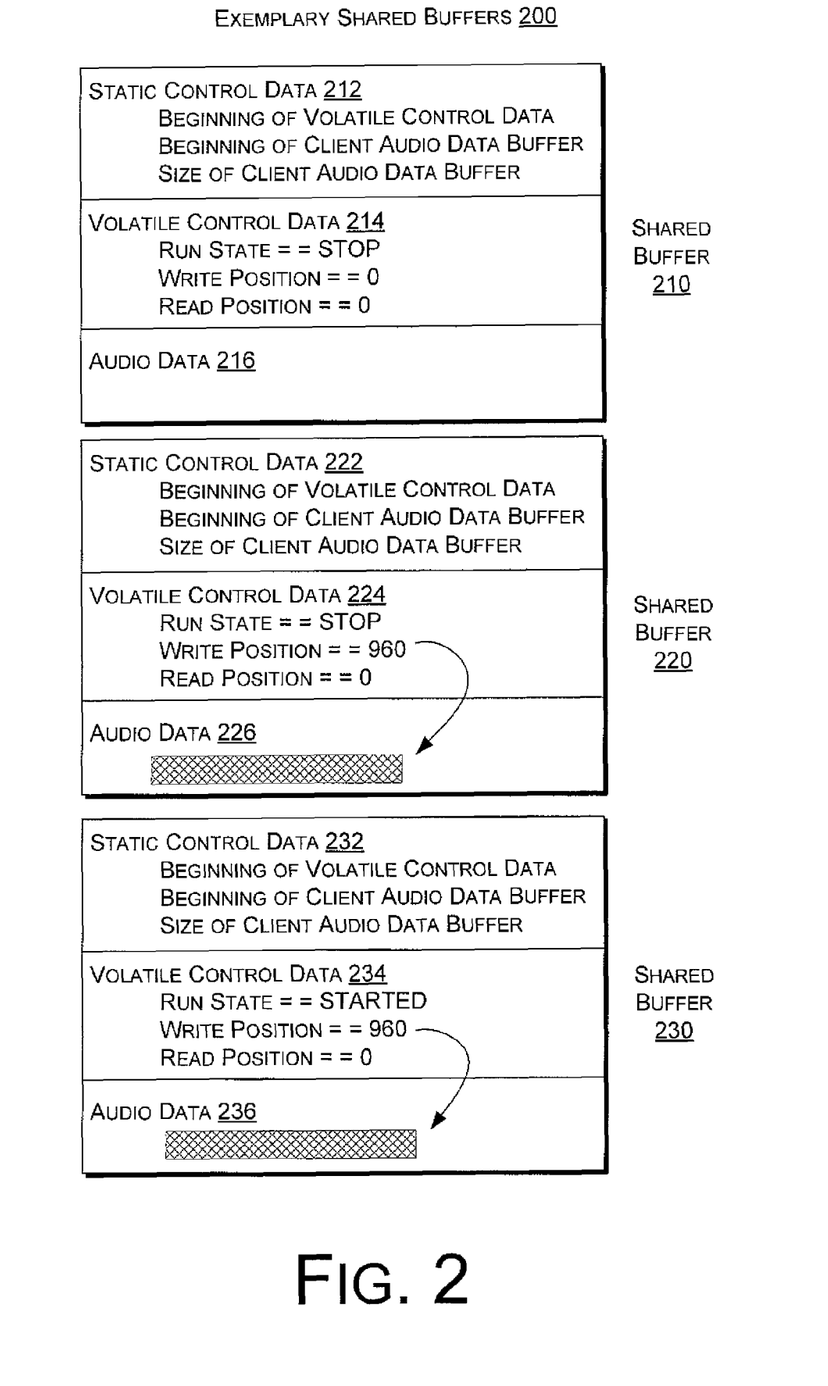
FIG. 2 is a block diagram of various exemplary shared buffers that include header information and an audio data region.

FIG. 2 shows some specific examples of audio headers and audio data where commands and write and read positions are indicated. As already mentioned, there are two major types of audio glitches "client starvation" (client does not supply sufficient audio data in a timely manner) and "audio engine starvation" (audio engine does not supply sufficient data in a timely manner). In terms of system resiliency, clients should avoid interrupting the timely flow of audio data in the audio engine. Further, in a capture scenario, a client should avoid "under reading" data, which can lead to loss of some of the captured audio information.

As shown in FIG. 2, a client has an associated shared audio buffer that includes two data blocks in a header and a region where audio data resides. In the examples of FIG. 2, the first data block contains "static control data" and the second data block contains "volatile control data". Static control data includes information that describes state in the shared audio buffer and it typically does not change during the duration of its lifetime. Static control data may include, for example, size of the shared data buffer, amount of time that that data represents (the sampling rate), number of channels that that data represents, etc.

Volatile control data includes information that describes state in the shared audio buffer that changes during the duration of its lifetime. Static data may include, for example, whether the shared audio buffer is in a "started" state (i.e., streaming is occurring), last read or write position of the client, last read or write position of the audio engine, last position of the data that is captured or rendered in the audio hardware, etc.

As already mentioned, various exemplary techniques described herein can obviate the need for buffer locks. An exemplary lock-free system requires that each individual client application supply sufficient data in a timely manner to the shared audio buffer when rendering or read sufficient data in a timely manner from the shared audio buffer when capturing. Failure to write or read data in a timely manner results in a client starvation glitch for the involved stream, but does not interrupt processing of the audio engine.

Clients can use any of the following techniques to write or read sufficient audio data in a timely manner to or from the shared audio buffer:
1. Client uses a timer and wakes up periodically;
2. Client requests that the audio engine signal them periodically; or
3. Client registers in a thread ordered group and is woken up in lock-step with the audio engine.

Shared audio buffer 210 of FIG. 2 shows a basic layout of the buffer's data structure: static control data 212, volatile control data 214 and audio data 216. When a client initializes a stream in the audio engine, it starts up in initialized state that is considered "unstarted" or "stopped" (see volatile control data 214) and write and read positions are null (e.g., "0"). In this state, no audio data resides in the audio data region of the buffer 210.

Shared audio buffer 220 of FIG. 2 shows a "pre-roll" state of the buffer for a rendering scenario with static control data 222, volatile control data 224 and audio data 226. The client places a certain amount of audio data in the audio data portion 226 before calling "Start" to let the audio engine known that the data should be read from the buffer 220. Noting that pre-roll is not typically required when client applications capture audio data. In this example, the volatile data 224 indicates the write position (e.g., "960").

After the client pre-rolls data, it will typically call "Start". Shared audio buffer 230 of FIG. 2 shows static control data 232, volatile control data 234 and audio data 236 where the volatile data 234 indicates a "Started" state. Accordingly, a call to "Start" changes a data member in the volatile control data and allows the audio engine to know that it can read data from or write data to the audio data region 236.

Although audio data buffering typically involves a "circular buffer" (i.e. when the end of the buffer is reached, data is written starting at the beginning of the buffer, overwriting any data that previously resided there), it is often easier to conceive of audio data streaming in a continuous timeline.

Figure 3:
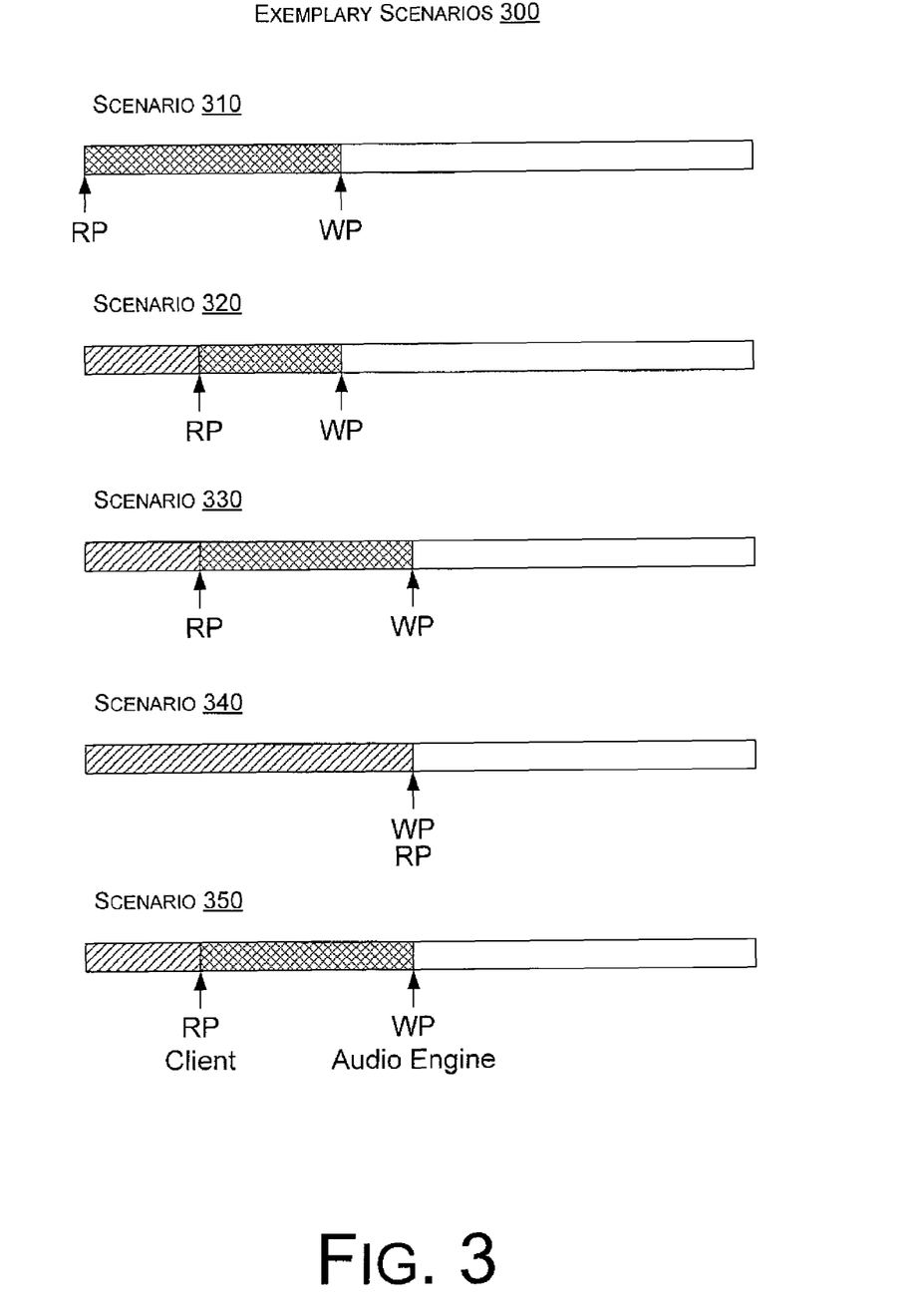
FIG. 3 is a series of timelines for various scenarios where a read position and a writer position are used to track information in a shared buffer.

FIG. 3 shows various exemplary scenarios 310, 320, 330, 340 and 350 using a timeline that indicates read position and write position of a shared buffer. The timeline for the scenario 310 corresponds to a start state where a client has pre-rolled audio data to a shared buffer.

The timeline for the scenario 320 corresponds to a started state where an audio engine pass has occurred. In this scenario, the read position is advanced while the write position is maintained as in the scenario 310. For example, the timeline may correspond to the state of the "read" index or position after the audio engine has read or consumed one period's worth of data. As such, the read position is advanced by the number of bytes represented by one period's worth of audio data. Note that the client write position is still ahead of the audio engine's read position, as this is the normal desired state of the shared buffer.

The timeline for the scenario 330 corresponds to a client writing additional audio data to the shared buffer to thereby maintain the write position ahead of the read position. Note that in this example, the amount of data written by the client is less than the amount of data written during pre-roll. Hence, a client may write a different amount of audio data to a shared buffer in a manner dependent on state or other condition(s). The timeline in this scenario may be viewed as the client waking up and writing more data to stay ahead of the audio engine's read position. The read advance of scenario 320 and the write advance of scenario 330 may continue as streaming advances.

The timeline for the scenario 340 corresponds to a client starvation glitch for a started state where the write position and the read position coincide. In this example, if the client write position does not stay ahead of the audio engine write position, the audio engine may notice that insufficient data exists and in response forego reading any data. If a partial amount of data (i.e., less than a period's worth of data) is present, it will be read and a partial starvation may occur.

As demonstrated by the scenarios of FIG. 2, a normal sequence does not require any locks. In these scenarios, responsibility may be placed on a client to stay ahead of the audio engine's shared buffer position.

The timeline for the scenario 350 is included for completeness. This timeline shows the normal desired state for the read and write positions when the client is capturing audio (i.e., the audio engine is writing and the client is capturing). The audio engine must write data to the shared buffer ahead of the client's reads of the audio data in the shared buffer. If the client application does not read a sufficient amount of data in a timely manner, data may be over-written and lost.

Figure 4:
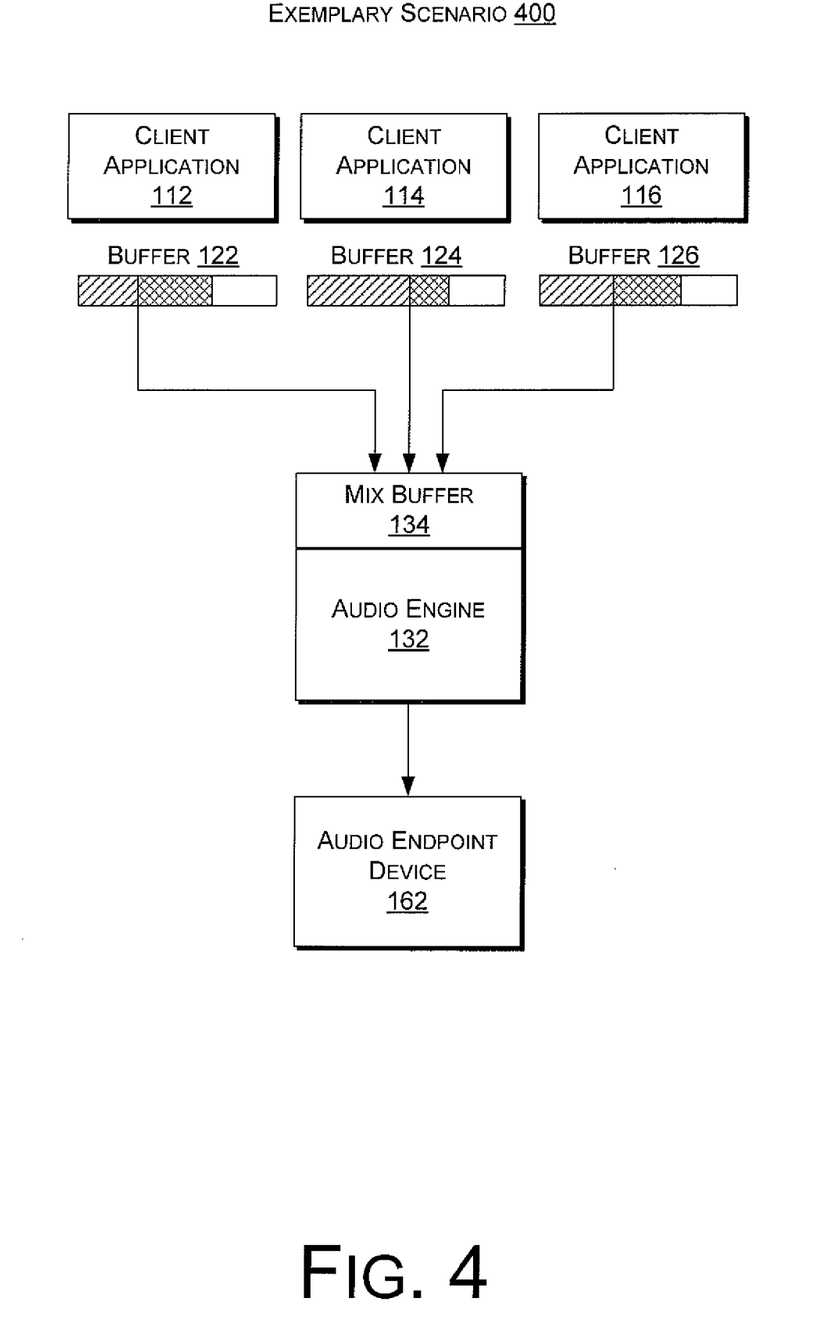
FIG. 4 is a diagram of an exemplary scenario where three client applications use an audio engine to render audio data.

FIG. 4 shows an exemplary scenario 400 where client applications 112, 114 and 116 write at least some audio data to shared buffers 122, 124 and 126, respectively. An audio engine 132 reads the audio data from the shared buffers 122, 124 and 126 into a mix buffer 134. The audio engine 132 then outputs audio, as appropriate, to an audio endpoint device 162. In this scenario, each of the shared buffers 122, 124 and 126 includes a write pointer or index to indicate a write position and a read pointer or index to indicate a read position. One or more mechanisms may be used to ensure that each of the write pointers remains ahead of its respective read pointer. In some examples, a mechanism may operate to ensure that a write position is equal to or ahead of a read position.

As already mentioned, exemplary mechanisms include a client application signal to wake up a client, an audio engine signal to wake up a client, and a client registered thread that operates to wake up a client (e.g., optionally in lock-step with an audio engine). One these mechanisms may be assigned as a default mechanism. For example, an audio system may assume that a client takes responsibility for keeping ahead of an audio engine during a rendering process (i.e., audio data from the client to the audio engine). In such an example, a client application may include a timer that periodically wakes up the client or otherwise calls for the client to write audio data to a shared buffer.

In an exemplary audio system, an audio engine may request audio data on a regular basis (e.g., about every 10 ms) when operating in a shared mode. Such a request may go to each shared buffer where multiple applications seek use of the audio engine. For example, if a user is playing media using a media player application and playing a game using a gaming application that uses audio to mark various events (e.g., notifications), the audio engine may request audio data from a shared buffer for the media player application and request audio data from a shared buffer for the gaming application every 10 ms. Where audio data resides in both shared buffers, the audio engine may mix the audio data and output, for example, a "ding" on top of a song. As already mentioned, an audio system may require that such a ding and song be in a standard format for streaming (e.g., PCM).

The aforementioned exemplary mechanisms may be classified as push mode mechanisms or pull mode mechanisms. For example, a client application wake up timer may be considered a push mode mechanism. Once woken by the timer, a client application may send an instruction to check the status of a shared buffer. If the buffer is full or otherwise sufficiently filled then the application may go back to sleep or perform other tasks, as appropriate. In general, the client application wants to ensure that it is ahead of next audio engine read cycle. If an audio engine wakes up every 10 ms, then the client application may determine timer timing based in part on how many milliseconds of audio data it writes per write cycle, which may vary. For example, if a client application writes 20 ms of audio data every 10 ms, then it ensures that audio data will be available for an audio engine that reads 10 ms of audio data every 10 ms. This exemplary mechanism may operate asynchronously with respect to an audio engine.

A client application may need to decompress audio data prior to writing the data to a shared buffer. In general, such applications typically decompress and buffer chunks of data that are larger than the chunk size written to a shared buffer (e.g., several hundred milliseconds versus tens of milliseconds).

The aforementioned audio system wake up signal for a client application may be considered a pull mode mechanism. Such a mechanism may be initiated or called for by a client. For example, a client may request such a signal from an audio engine. Hence, an audio engine may send an update to a client ("X bytes of audio data read from shared buffer, write more"). The request from a client may be in the form of an event handle that is used by the audio engine to send a signal to the client. Knowledge of a thread may not be required by such a mechanism (see description of thread ordering mechanism below). Where multiple clients request signals, the event handles may be taken in turn by an audio engine. For example, an audio engine may maintain a list of client registered event handles and it may periodically go down the list every 10 ms or according to an audio engine cycle (e.g., engine period).

In general, this mechanism is driven by the audio engine (i.e., the consumer of audio data), which may ensure that all clients are apprised of its need for audio data. This mechanism may allow for a smaller shared buffer size when compared to the client side timer mechanism. This mechanism can also be more deterministic. As described further below, the client side timer and the audio engine signal mechanisms may coexist without conflict. Hence, one application may use both or one application may use a client side timer and another application may use an audio engine signal for purposes of writing data to respective shared buffers.

The aforementioned thread mechanism may be considered a push mode mechanism. In general, the client side timer and audio engine signal mechanisms do not require knowledge of a thread. In the thread ordering mechanism, a client application may register a thread upon an initial write to a shared buffer. For example, a client application may register a thread with an audio engine using an appropriate API (see, e.g., API 118 of FIG. 1). The audio engine may use the registered thread to wake up a client in lock-step with the audio engine to achieve complete synchrony. Such a mechanism may effectively wake up a client application just before consumption of data by the audio engine.

The three foregoing mechanisms can affect shared buffer size (e.g., size of a circular buffer). In general, the client side timer mechanism will require a larger shared buffer than the audio engine signal mechanism, which will require a larger shared buffer than the thread ordering mechanism. Further, where a client needs to decompress audio data prior to writing to a shared buffer, client side buffer requirements would be ranked similarly.

With respect to latency (i.e., how long it takes for a sound from one place to get to another), the audio engine signal and thread ordering mechanism may perform better than the client side timer mechanism. For example, an audio engine signal mechanism may be used for gaming applications where low latency enhances user experience (e.g., consider that a game may play background music and nearly simultaneously call for speech and environmental or mechanical sounds).

In the foregoing example of a ding sound and media player music, a ding sound may use a client application side timer while a media player may use a client application side timer or an audio engine signal to ensure an appropriate amount of audio data exists or is written to a shared buffer.

Figure 5:
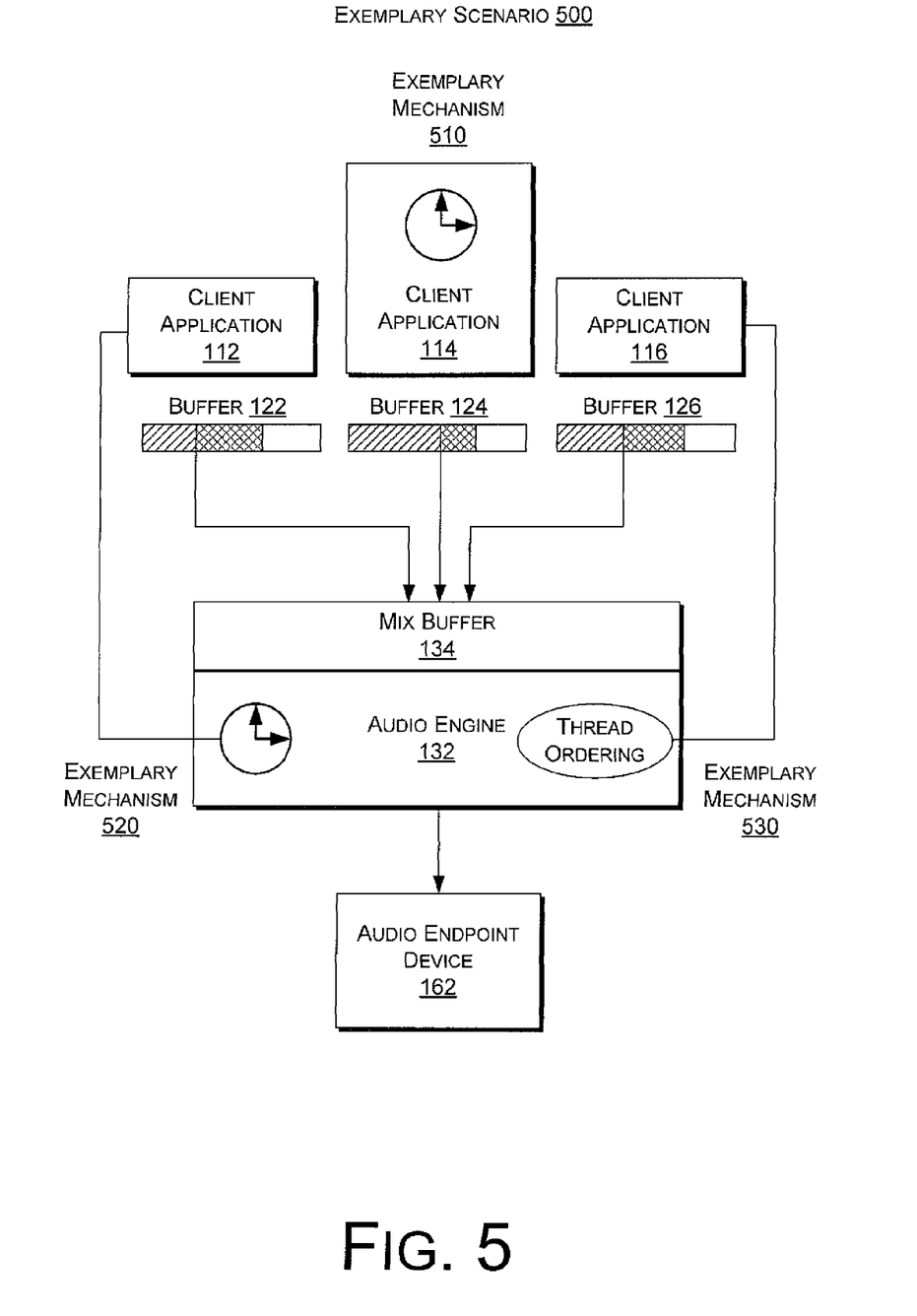
FIG. 5 is a diagram of an exemplary scenario where three client applications use an audio engine to render audio data and where the clients may use any of a variety of lock-free mechanisms to help avoid lock-associated issues.

FIG. 5 shows an exemplary scenario 500 where three mechanisms 510, 520 and 530 are used by three different client applications 112, 114, 116. The client application 114 uses a client side timer or signaling mechanism 510 to cause the client to write audio data to the shared buffer 124 or to at least check on the amount of audio data in the shared buffer 124. The client application 112 uses an audio engine signal mechanism 520 (e.g., an audio engine timer) to write audio data to the shared buffer 122 or to at least check on the amount of audio data in the shared buffer 122. The client application 116 uses a thread ordering mechanism 530 to write audio data to the shared buffer 126 or to at least check on the amount of audio data in the shared buffer 126. Note that the buffers 122, 124 and 126 may be completely independent (although residing in the same memory space). More specifically, the write pointers and the read pointers of the buffers 122, 124 and 126 may be completely independent of each other.

FIG. 5 shows how multiple audio buffers may be read by an audio engine. The audio engine 132 has an ability to read from multiple buffers (e.g., 122, 124 and 126), regardless of which mechanism a client application uses to time its write of audio data to the audio data buffer. Client 114 could, for example, wake up on its own timer. Client 112 could wake up on based on a signal from the audio engine 132 that a processing pass has been completed. Client 116 could wake up based on a thread ordering scheme where the client's thread always runs before or after the audio engine's thread. In a scheme based on locks (e.g., mutex), mixing of these different types of clients would not be possible. While in the scenario 500, because neither a client nor the audio engine can hold a lock or deny access to a client's shared audio buffer, each client's processing is truly asynchronous from any other involved entity.

Overall, the exemplary scenario 500 demonstrates how three different types of mechanisms may operate simultaneously to reduce lock-associated issues and optionally reduce latency for three client applications. A developer may, with a priori knowledge of available mechanisms, choose which mechanism or mechanisms to rely on when developing an application that uses audio. While various examples pertain to rendering, similar schemes may be used for capturing.

The exemplary audio engine 132 of the scenario 500 may correspond to an operating system audio engine that includes a thread-based signaling mechanism 530 to signal a client application 116 (or other client), based on a registered client application thread, to write audio data to a shared buffer 126 accessible by the audio engine 132 and an event handle-based signaling mechanism 520 to signal a client application 112 (or other client), based on a registered client application event handle, to write audio data to a shared buffer 122 accessible by the audio engine 132. Such an exemplary audio engine may include a mix buffer 134 to buffer audio data read from one or more shared buffers 122, 124, 126.

An exemplary audio engine may use a mix buffer to buffer audio data read from a shared buffer associated with a client application that uses the thread-based signaling mechanism (e.g., mechanism 530) and audio data read from a shared buffer associated with a client application that uses the event handle-based signaling mechanism (e.g., mechanism 520). An audio engine may include a mixing mechanism to mix audio data read from a shared buffer associated with a client application that uses the thread-based signaling mechanism and audio data read from a shared buffer associated with the client application that uses an event handle-based signaling mechanism. A mix buffer may buffer audio data read from a shared buffer associated with a client application that includes a client timer signaling mechanism (e.g., mechanism 510) to signal the client application to write audio data to a shared buffer accessible by the audio engine.

The exemplary audio engine 132 of scenario 500 is compatible with one or more lock-free mechanisms for streaming audio from one or more shared buffers. In the example of FIG. 5, lock-free mechanisms include the thread-based signaling mechanism 530, the event handle-based signaling mechanism 520 and the client signaling mechanism 510.

As described herein, an exemplary audio system includes an audio engine, one or more shared buffers (where each shared buffer is associated with a client application) and one or more lock-free mechanisms to help ensure proper streaming if the write position in the shared buffer stays equal to or ahead of the read position for that shared buffer during audio rendering or audio capturing. Various exemplary mechanisms help ensure that a write position of a shared buffer stays equal to or ahead of a read position for that shared buffer and ensure that a client application's failure to maintain a write position equal to or ahead of a read position does not prevent audio engine access to the shared buffer. Similarly, an audio engine may use a lock-free mechanism to avoid holding off operation of a client application.

If a client application does not write (e.g., for rendering) or read (e.g., for capturing) sufficient data in a timely manner, a glitch may occur. However, as various exemplary mechanisms are lock-free, a client application cannot lock a shared buffer, which, as already explained, can prevent access by an audio engine. Hence, mechanisms described herein can prevent harm (e.g., halting a process or processes) if a client application or an audio engine is unable to meet its demand with respect to a shared buffer.

Figure 6:
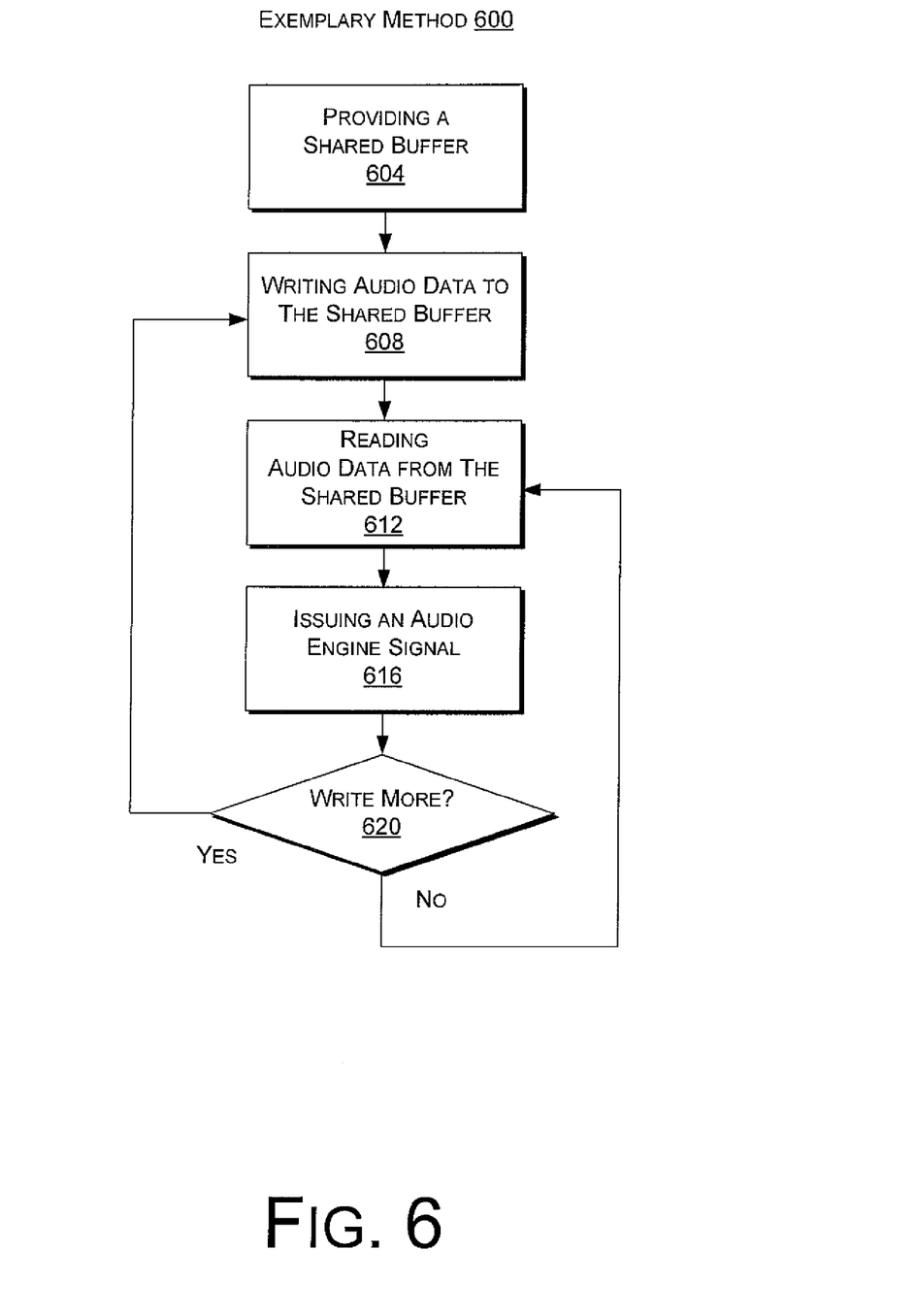
FIG. 6 is a diagram of an exemplary method for an audio system.

FIG. 6 shows an exemplary method 600 that includes providing a shared buffer for audio data 604 where the sharing occurs between a client application and an audio engine, writing audio data to the shared buffer by the client application 608, reading audio data from the shared buffer by the audio engine 612 and issuing, periodically, an audio engine signal 616, for example, to prompt the client application to write more audio data to the shared buffer. A decision block 620 may be used to decide whether more audio data should be written to the shared buffer. For example, if the audio engine signal prompts the client application to assess or obtain a status of the shared buffer, then a decision as to writing more audio data may be based on the status. While the example of FIG. 6 mentions writing, a decision may be made for reading as well.

With respect to a status, a status may pertain to audio frame information. For example, a client application may decide not to write audio data to the shared buffer if the status indicates that the shared buffer includes a predetermined number of unread audio frames (e.g., one or more or other criterion or criteria). An audio engine signal per block 616 may prompt a client application to determine an amount of audio data that can be written to the shared buffer without risk of overwriting previously written data that the audio engine has not yet read from the shared buffer. Such information may be considered a status.

The method 600 may include a block that causes a client application to execute a data loading function responsive to the audio engine signal 616 where the loading function specifies a number of audio frames to be written to the shared buffer.

The exemplary method 600 may include blocks for registering an event handle with the audio engine to allow the audio engine to direct the audio engine signal to the client application, registering a thread with the audio engine to allow the audio engine to direct the audio engine signal to the client application, etc. For a thread-based mechanism, issuing an audio engine signal per block 616 may occur in a particular thread order.

As described herein, various exemplary techniques allow for one or more lock-free shared audio buffers in an audio system. A lock-free shared audio buffer does not depend on a lock or locks. Instead, a client application and/or an audio engine include a mechanism or mechanisms to manage read and/or write positions for a shared buffer. Hence, a client application cannot lock a shared buffer and thereby hold off operation of an audio engine. Similarly, an audio engine may use a lock-free mechanism to avoid holding off operation of a client application.

Figure 7:
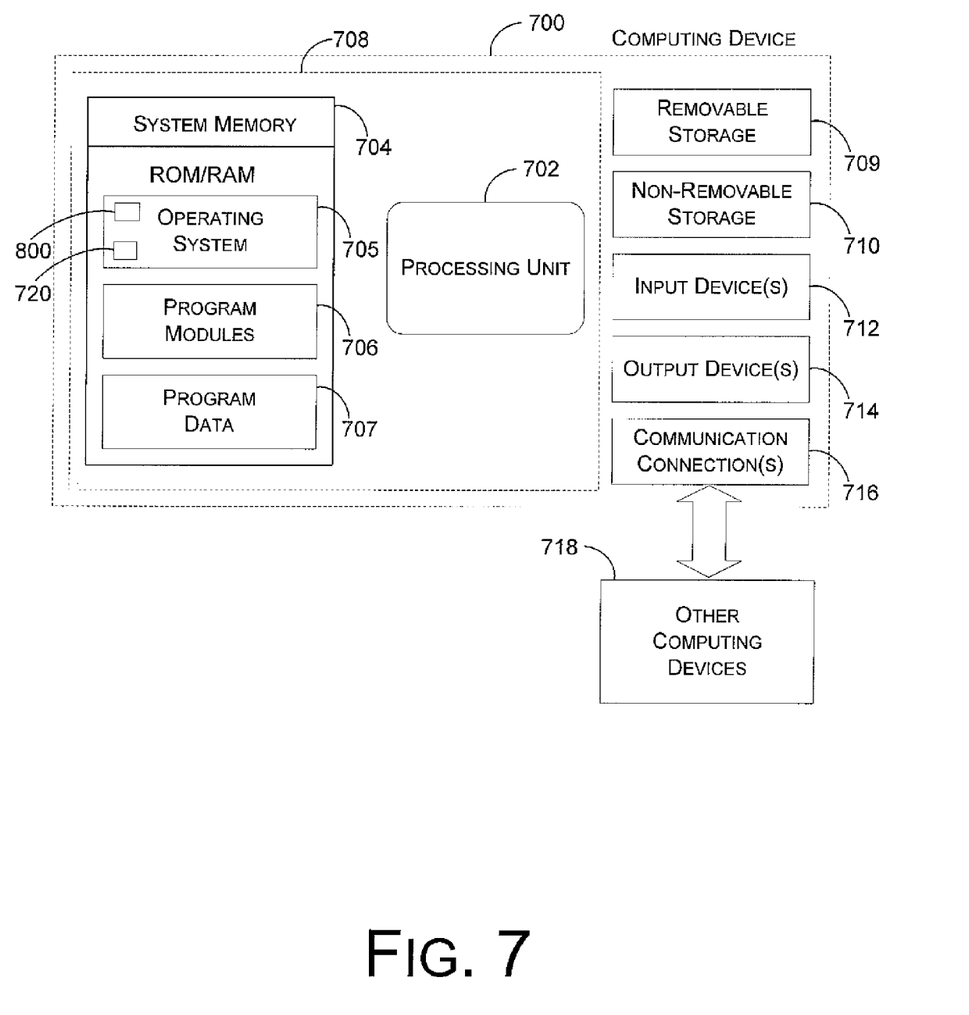
FIG. 7 is a block diagram of an exemplary computing device.

FIG. 7 illustrates an exemplary computing device 700 that may be used to implement various exemplary components and in forming an exemplary system. For example, an exemplary audio system or audio engine may be implemented using a computing device that includes various features of the device 700. An audio engine, a component (e.g., a method or a function) for use by an audio engine, a client application or a shared buffer, or a component for use in conjunction with an audio engine, a client application or a shared buffer may be in the form of instructions (e.g., computer or processor executable instructions) stored on a storage medium (e.g., computer or processor-readable medium). Such an audio engine or component(s) may be in the form of a software module.

In a very basic configuration, computing device 700 typically includes at least one processing unit 702 and system memory 704. Depending on the exact configuration and type of computing device, system memory 704 may be volatile (such as RAM), non-volatile (such as ROM, flash memory, etc.) or some combination of the two. System memory 704 typically includes an operating system 705, one or more program modules 706, and may include program data 707. The operating system 706 include a component-based framework 720 that supports components (including properties and events), objects, inheritance, polymorphism, reflection, and provides an object-oriented component-based application programming interface (API), such as that of the .NET™ Framework manufactured by Microsoft Corporation, Redmond, Wash. The operating system 705 also includes an exemplary audio engine 800, such as, but not limited to, the exemplary audio engine 132. Further, the computing device 700 may include a software module for generating an audio engine 800 and/or providing audio engine features such as the mechanisms 520 and 530 of FIG. 5. The computing device 700 may include modules for client applications and one or more shared buffers, for example, a module may provide for the mechanism 510 of FIG. 5. The device 700 is of a very basic configuration demarcated by a dashed line 708. Again, a terminal may have fewer components but will interact with a computing device that may have such a basic configuration.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device (e.g., a microphone), touch input device, etc. Output device(s) 714 such as a display, speaker(s), printer, etc. may also be included. These devices are well know in the art and need not be discussed at length here.

Computing device 700 may also contain communication connections 716 that allow the device to communicate with other computing devices 718, such as over a network (e.g., consider a client application that streams audio data from the Web or other network). Communication connections 716 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article of manufacture comprising:
a computer readable storage device; and
computer-executable instructions stored on the computer readable storage device that, when executed by a computing device, program the computing device to perform operations including:
writing audio data to a plurality of shared buffers, the writing being performed by a plurality of client applications of the computing device, wherein
the writing is performed by a first of the client applications in response to receiving a signal from a thread-based signaling mechanism of an audio engine of the computing device, by a second of the client applications in response to receiving a signal from an event handle-based signaling mechanism of the audio engine, and by a third of the client applications in response to receiving a signal from a client timer signaling mechanism,
each shared buffer is associated with one of the client applications, none of the plurality of shared buffers is associated with a lock, and sharing of the shared buffers occurs between the client application associated with each shared buffer and the audio engine;

simultaneously reading, by the audio engine, audio data from multiple ones of the shared buffers; and issuing, periodically an audio engine signal to prompt the client applications to write more audio data to the shared buffers, wherein the signaling mechanisms of the audio engine enable lock-free reading and writing from the shared buffers, wherein the audio engine signal prompts one of the client applications to obtain a status of the shared buffer associated with that client application, and wherein one of the client applications decides not to write audio data to the shared buffer associated with the one of the client applications if the status indicates that the shared buffer includes a predetermined number of unread audio frames.

2. The article of claim 1, wherein the audio engine further includes a mix buffer to buffer audio data read from the shared buffers.

3. The article of claim 2 wherein the audio engine comprises a mixing mechanism to mix the audio data read from the first shared buffer and from the second shared buffer.

4. The article of claim 2 wherein the operations include providing one or more lock-free mechanisms for streaming audio from the shared buffers, the lock-free mechanisms helping to ensure that a write position of one of the shared buffers stays equal to or ahead of a read position for that shared buffer and to ensure that a client application's failure to maintain the write position equal to or ahead of the read position does not prevent audio engine access to the shared buffer.

5. The article of claim 1 wherein at least one of the shared buffers includes two control blocks, one for static control data and the other for volatile control data.

6. The article of claim 5 wherein one or more lock-free mechanisms for streaming audio from one or more shared buffers utilize information stored in one or both of the two control blocks.

7. A method comprising:

writing, by a computing device, audio data to a plurality of shared buffers, the writing being performed by a plurality of client applications of the computing device, wherein the writing is performed by a first of the client applications in response to receiving a signal from a thread-based signaling mechanism of an audio engine of the computing device, by a second of the client applications in response to receiving a signal from an event handle-based signaling mechanism of the audio engine, and by a third of the client applications in response to receiving a signal from a client timer signaling mechanism, each shared buffer is associated with one of the client applications, none of the plurality of shared buffers is associated with a lock, and sharing of the shared buffers occurs between the client application associated with each shared buffer and the audio engine;

simultaneously reading, by the audio engine, audio data from multiple ones of the shared buffers; and issuing, periodically, by the computing device, an audio engine signal to prompt the client applications to write more audio data to the shared buffers, wherein the signaling mechanisms of the audio engine enable lock-free reading and writing from the shared buffers, wherein the audio engine signal prompts one of the client applications to obtain a status of the shared buffer associated with that client application, and wherein one of the client applications decides not to write audio data to the shared buffer associated with the one of the client applications if the status indicates that the shared buffer includes a predetermined number of unread audio frames.

8. The method of claim 7 further comprising registering an event handle with the audio engine to allow the audio engine to direct the audio engine signal to one of the client applications.

9. The method of claim 7 further comprising registering a thread with the audio engine to allow the audio engine to direct the audio engine signal to one of the client applications.

10. The method of claim 9 wherein the issuing of an audio engine signal occurs in a particular thread order.

11. The method of claim 7 wherein the status comprises audio frame information.

12. The method of claim 7 wherein the client application decides whether to write audio data to the shared buffer based on the status of the shared buffer.

13. The method of claim 7 wherein one of the client applications executes a data loading function responsive to the audio engine signal that specifies a number of audio frames to be written to the shared buffer associated with that client application.

14. An audio system comprising:

a processor;

an audio engine configured to be operated by the processor;

a plurality of shared buffers where each shared buffer is associated with a client application and no two client applications are associated with a same shared buffer, wherein none of the shared buffers is associated with a lock, and each of the shared buffers includes two control blocks, one for static control data and the other for volatile control data, the volatile control data storing read and write positions for the shared buffer; and one or more lock-free mechanisms configured to be operated by the processor to help ensure that the write position of one of the shared buffers stays equal to or ahead of the read position for that shared buffer and to ensure that a client application's failure to maintain the write position equal to or ahead of the read position does not prevent audio engine access to the shared buffer, wherein the audio engine includes a plurality of signaling mechanisms, the plurality of signaling mechanisms including:

a thread-based signaling mechanism to signal a first of the client applications, based on a registered client application thread, to write audio data to a first of the shared buffers; and an event handle-based signaling mechanism to signal a second of the client applications, based on a registered client application event handle, to write audio data to a second of the shared buffers, wherein a third of the client applications is associated with a client timer signaling mechanism to signal the third of the client applications to write audio data to a third of the shared buffers, and wherein the audio engine is configured to simultaneously read audio data from the first, second, and third of the shared buffers, wherein the audio engine signal prompts one of the client applications to obtain a status of the shared buffer associated with that client application, and wherein one of the client applications decides not to write audio data to the shared buffer associated with the one of the client applications if the status indicates that the shared buffer includes a predetermined number of unread audio frames.

* * * * *